US012752578B2

(12) United States Patent
Takagi et al.

(10) Patent No.: US 12,752,578 B2
(45) Date of Patent: Oct. 6, 2026

(54) IN-VEHICLE RECEIVER AND TIRE AIR PRESSURE MONITORING SYSTEM

(71) Applicant: DENSO CORPORATION, Kariya-city (JP)

(72) Inventors: Yuki Takagi, Kariya-city (JP); Toshiyuki Kuroyanagi, Kariya-city (JP); Koji Murayama, Kariya-city (JP); Hiromichi Hanai, Kariya-city (JP); Yoshinori Hanai, Kariya-city (JP); Mitsuhiro Fukushima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 267 days.

(21) Appl. No.: 18/763,955

(22) Filed: Jul. 3, 2024

(65) Prior Publication Data

US 2024/0351380 A1 Oct. 24, 2024

Related U.S. Application Data

(63) Continuation of application No. PCT/JP2022/045714, filed on Dec. 12, 2022.

(30) Foreign Application Priority Data

Jan. 12, 2022 (JP) ................................ 2022-003329

(51) Int. Cl.
*B60C 23/04* (2006.01)
*G01L 17/00* (2006.01)

(52) U.S. Cl.
CPC .......... *B60C 23/0454* (2013.01); *G01L 17/00* (2013.01)

(58) Field of Classification Search
CPC .......................... B60C 23/0454; G01L 17/00
See application file for complete search history.

(56) References Cited

U.S. PATENT DOCUMENTS

2005/0132791 A1* 6/2005 Hayashi ............. B60C 23/0466 73/146
2006/0001534 A1* 1/2006 Shida ................. B60C 23/0408 73/146
2009/0102634 A1 4/2009 Okada et al.
(Continued)

FOREIGN PATENT DOCUMENTS

EP 2451659 B1 * 4/2014 ......... B60C 23/0459
JP 2009097272 A 5/2009
(Continued)

*Primary Examiner* — Chico A Foxx
(74) *Attorney, Agent, or Firm* — Harness, Dickey & Pierce, P.L.C.

(57) ABSTRACT

A tire air pressure monitoring system for a vehicle includes: transmitters in wheels for transmitting a frame related to a tire air pressure at a regular transmission period; and an in-vehicle receiver having an electric wave reception unit that receives the frame and a specific electric wave from a mobile terminal and a control unit that detects a decrease in the tire air pressure. The control unit switches to a specific mode in which the electric wave reception unit receives the specific electric wave at every first intermittent period while a starting switch is off, and switches from the specific mode or a power saving mode to a monitoring mode in which the electric wave reception unit receives the frame at every second intermittent period while the starting switch is off.

11 Claims, 10 Drawing Sheets

(56) References Cited

U.S. PATENT DOCUMENTS

| | | | | |
|---|---|---|---|---|
| 2012/0064830 | A1* | 3/2012 | Okada | B60C 23/0418 455/41.2 |
| 2016/0167459 | A1 | 6/2016 | Okada et al. | |
| 2019/0184774 | A1* | 6/2019 | Okada | G07C 5/0808 |

FOREIGN PATENT DOCUMENTS

| | | | | | |
|---|---|---|---|---|---|
| JP | 2013026732 | A | * | 2/2013 | G07C 9/00182 |
| JP | 2013043535 | A | * | 3/2013 | B60C 23/0418 |
| JP | 2013248916 | A | * | 12/2013 | B60C 23/0418 |
| JP | 2015044567 | A | | 3/2015 | |
| JP | 5815472 | B2 | | 11/2015 | |
| JP | 6331679 | B2 | | 5/2018 | |
| WO | WO-2015015692 | A1 | * | 2/2015 | B60C 23/0462 |
| WO | WO-2016148039 | A1 | * | 9/2016 | B60C 23/04 |

* cited by examiner

IN-VEHICLE RECEIVER AND TIRE AIR PRESSURE MONITORING SYSTEM

CROSS REFERENCE TO RELATED APPLICATION

The present application is a continuation application of International Patent Application No. PCT/JP2022/045714 filed on Dec. 12, 2022, which designated the U.S. and claims the benefit of priority from Japanese Patent Application No. 2022-003329 filed on Jan. 12, 2022. The entire disclosures of all of the above applications are incorporated herein by reference.

TECHNICAL FIELD

The present disclosure relates to an in-vehicle receiver and a tire air pressure monitoring system.

BACKGROUND

Conventionally, as a monitoring system for a tire air pressure, a system for receiving a frame transmitted from a transmitter by an in-vehicle receiver not only when the start switch of a vehicle is in an on-state but also when the start switch is in an off-state, and detecting a decrease of the tire air pressure by analyzing the information in the frame is known, for example, according to a conceivable technique. In addition, a system for receiving a frame transmitted from a transmitter attached to a tire by an in-vehicle receiver when the start switch of a vehicle is in an on-state, and receiving a specific electric wave output from a mobile terminal such as an electronic key by the in-vehicle receiver when the start switch of a vehicle is in an off-state is known.

SUMMARY

According to an example, a tire air pressure monitoring system for a vehicle may include: transmitters in wheels for transmitting a frame related to a tire air pressure at a regular transmission period; and an in-vehicle receiver having an electric wave reception unit that receives the frame and a specific electric wave from a mobile terminal and a control unit that detects a decrease in the tire air pressure. The control unit switches to a specific mode in which the electric wave reception unit receives the specific electric wave at every first intermittent period while a starting switch is off, and switches from the specific mode or a power saving mode to a monitoring mode in which the electric wave reception unit receives the frame at every second intermittent period while the starting switch is off.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
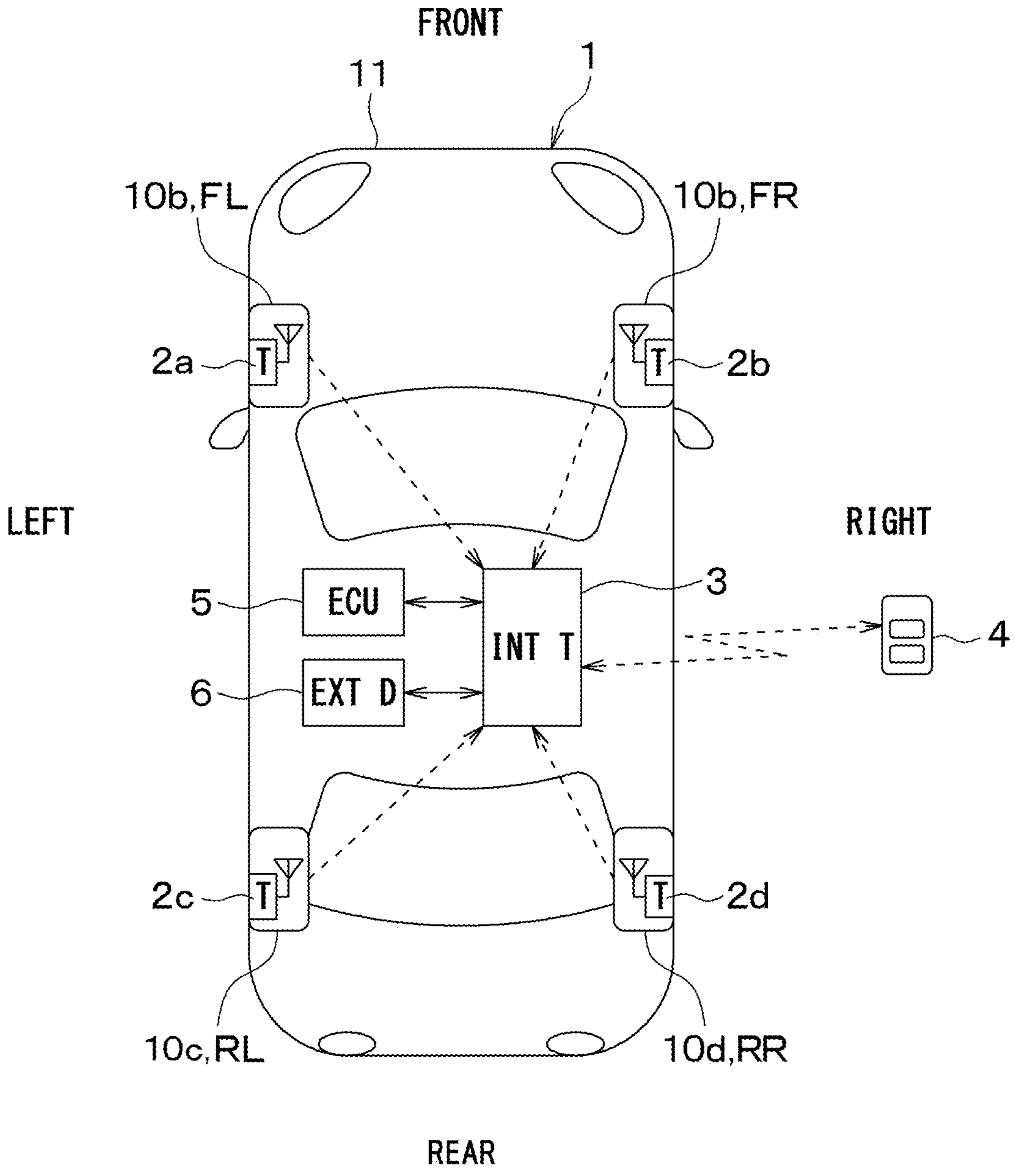
FIG. 1 is a schematic diagram showing a schematic configuration of a monitoring system for a tire air pressure according to a first embodiment.

The present inventors have considered, in a monitoring system for a tire air pressure, that an in-vehicle receiver receives a frame including information related to a tire air pressure in addition to a specific electric wave emitted by a mobile terminal while the start switch is in the off state. In this consideration, the present inventors revealed that the operation time of the in-vehicle receiver during the off state of the start switch increases, and the dark current in the in-vehicle receiver significantly increases if simply attempting to receive the frame and the specific electric wave separately during the off state of the start switch.

The present embodiments provide an in-vehicle receiver and a monitoring system for a tire air pressure that can receive both a frame including information related to a tire pressure and a specific electric wave output from a mobile terminal while suppressing an increase in dark current when the start switch is in an off state.

According to one aspect of the present embodiments, an in-vehicle receiver is included in a monitoring system for a tire air pressure applied to a vehicle having a plurality of wheels with tires.

The in-vehicle receiver includes:

- an electric wave receiving unit that receives a frame including information related to a tire air pressure transmitted at a predetermined regular transmission period by a transmitter provided in each of the tires of the plurality of wheels and a specific electric wave output from the mobile terminal; and
- a control unit that detects an occurrence of a decrease in the tire air pressure based on data related to the tire air pressure included in the frame.

While a start switch of the vehicle is in an off state, the control unit switches to a specific mode for receiving a specific electric wave by the electric wave receiving unit every predetermined first intermittent period. While the start switch of the vehicle is in the off state, the control unit switches from the specific mode or a power saving mode to a monitoring mode for receiving a frame by the electric wave receiving unit every predetermined second intermittent period to monitor the tire air pressure intermittently.

According to another aspect of the embodiments, a monitoring system for a tire air pressure is applied to a vehicle having a plurality of wheels with tires.

The monitoring system includes:

- a plurality of transmitters that are provided in each of the tires of the plurality of wheels and transmit a frame including information related to a tire air pressure at a predetermined regular transmission period; and an in-vehicle receiver provided on a body of the vehicle. The in-vehicle receiver includes:

an electric wave receiving unit that receives a frame and a specific electric wave output from a mobile terminal; and a control unit that detects an occurrence of a decrease in the tire air pressure based on data related to the tire air pressure included in the frame.

While a start switch of the vehicle is in an off state, the control unit switches to a specific mode for receiving a specific electric wave by the electric wave receiving unit every predetermined first intermittent period. While the start switch of the vehicle is in the off state, the control unit switches from the specific mode or a power saving mode to a monitoring mode for receiving a frame by the electric wave receiving unit every predetermined second intermittent period to monitor the tire air pressure intermittently.

According to the above features, while the start switch is in the off state, reception of the specific electric wave and monitoring of the tire air pressure are performed intermittently, so it is possible to reduce the operation time of the in-vehicle receiver while the start switch is in the off state. Therefore, it is possible to receive the specific electric wave and monitor the tire air pressure while suppressing an increase in dark current in the in-vehicle receiver.

Here, a parenthesized reference symbol attached to each constituent element or the like shows an example of the correspondence of the constituent element or the like and a specific constituent element or the like described in an embodiment to be described later.

Hereinafter, embodiments of the present disclosure will be described with reference to the drawings. In the following embodiments, components that are the same as or equivalent to those described in the preceding embodiment(s) will be indicated by the same reference symbols, and the description thereof may be omitted. In the following embodiments, when only partial configuration is described in one embodiment, remaining configuration may adopt same configurations as that described in the preceding embodiments. The following embodiments may be partially combined with each other even if such a combination is not explicitly described as long as there is no disadvantage with respect to such a combination.

First Embodiment

The present embodiment will be described with reference to FIGS. 1 to 7. Here, “front”, “rear”, “right”, and “left” shown in FIG. 1 indicate “front side”, “rear side”, “right side”, and “left side” of the vehicle 1.

The monitoring system for the tire air pressure is a system that monitors the tire air pressures of tires attached to a plurality of wheels 10*a* to 10*d*. The tire air pressure is the pressure inside the tire. Here, for convenience, the monitoring system for the tire air pressure may be referred to as “TPMS (i.e., tire pressure monitoring system)” below.

As shown in FIG. 1, the TPMS includes a plurality of TPMS transmitters 2*a* to 2*d* attached to the tires of the wheels 10*a* to 10*d*, respectively, and an integrated receiver 3 attached to the body 11 of the vehicle 1.

Figure 2:
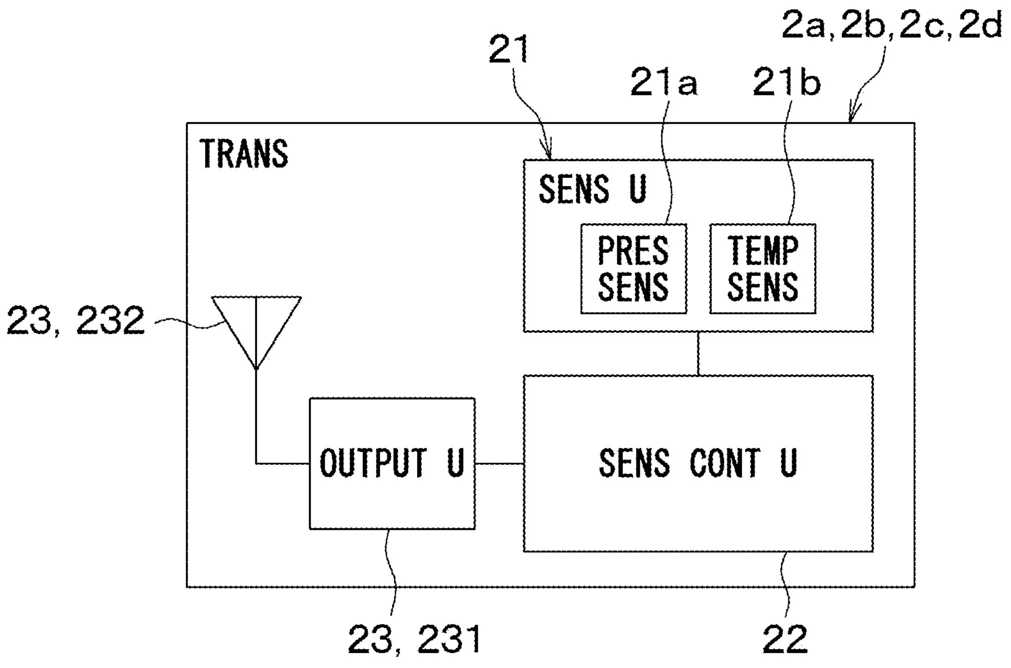
FIG. 2 is a block diagram showing a TPMS transmitter.

Each of the TPMS transmitters 2*a* to 2*d* is a transmitter that detects the tire air pressure of a tire to which the TPMS transmitter 2*a* to 2*d* is attached, and transmits a frame including information related to the tire air pressure (for example, a detection signal of the tire air pressure) at a predetermined regular transmission period T1. As shown in FIG. 2, each of the TPMS transmitters 2*a* to 2*d* includes a sensor unit 21, a sensor control unit 22, and an electric wave transmission unit 23.

The sensor unit 21 includes a pressure sensor 21*a* that detects the pressure inside the tire and a temperature sensor 21*b* that detects the temperature inside the tire. The sensor unit 21 outputs a detection signal of the pressure sensor 21*a* and a detection signal of the temperature sensor 21*b* to the sensor control unit 22.

The sensor control unit 22 includes a microcomputer having a processor and a memory, and its periphery devices. The sensor control unit 22 executes a transmission process and the like according to a program stored in the memory. The memory of the sensor control unit 22 stores ID information including identification information specific for a TPMS transmitter for specifying each of the TPMS transmitters 2*a* to 2*d* and identification information specific for a vehicle for specifying the vehicle 1. Here, the memory includes a non-transitional tangible storage medium.

When the sensor control unit 22 receives the detection signal output from the sensor unit 21, the sensor control unit 22 executes the signal processing of the detection signal, processes the detection signal as necessary, and stores data indicating the detection result together with ID information in a frame. Then, the sensor control unit 22 transmits the frame to the electric wave transmission unit 23.

The electric wave transmission unit 23 includes an output unit 231 and a transmission antenna unit 232. The output unit 231 transmits the frame transmitted from the sensor control unit 22 to the integrated receiver 3 as an electric wave in a predetermined frequency band (for example, a RF electric wave) through the transmission antenna unit 232.

Figure 3:
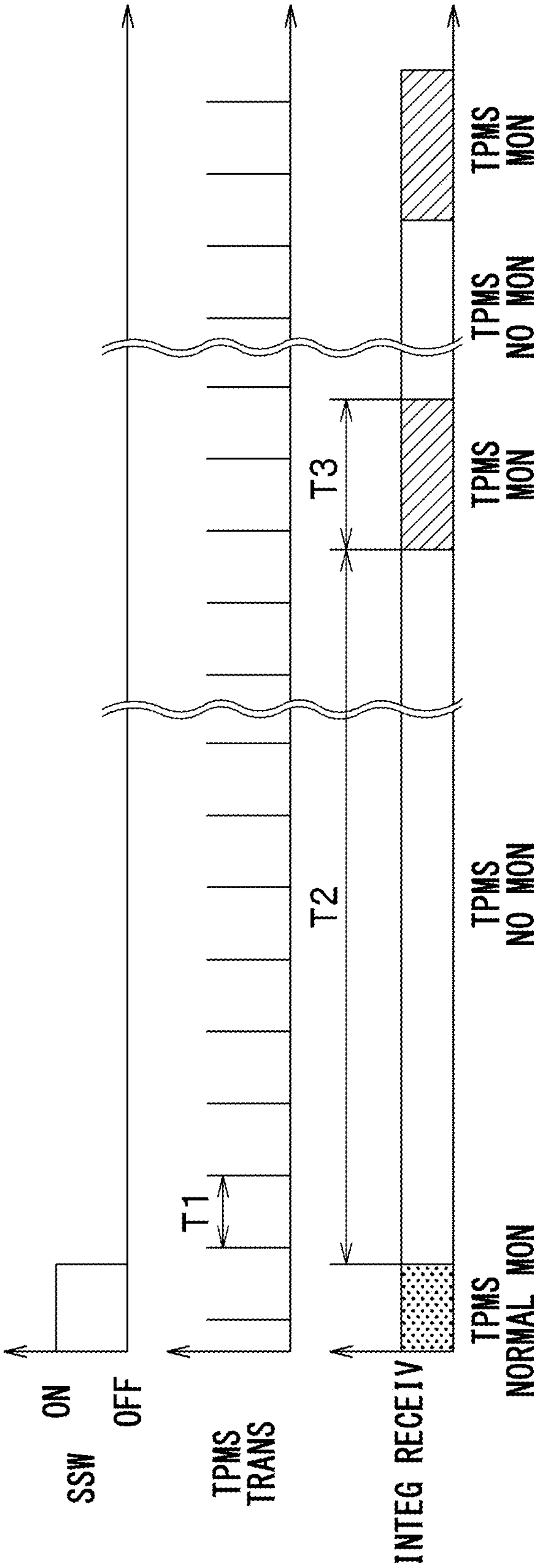
FIG. 3 is a timing chart for explaining the operation of the TPMS transmitter and an integrated receiver when the start switch is switched from the on state to the off state.

Each of the TPMS transmitters 2*a* to 2*d* is not provided with a function of receiving a signal from an external device, and cannot determine whether the start switch SSW of the vehicle 1 is in an on state or an off state. As shown in FIG. 3, the process of transmitting a signal from the sensor control unit 22 to the electric wave transmission unit 23 is executed at every predetermined regular transmission period T1, regardless of whether the start switch SSW is in an on state or an off state. That is, each of the TPMS transmitters 2*a* to 2*d* is configured to transmit a frame at every predetermined regular transmission period T1. Here, the start switch SSW corresponds to, for example, an ignition switch in an engine-equipped vehicle, or a switch that corresponds to a power switch in an EV vehicle.

Figure 4:
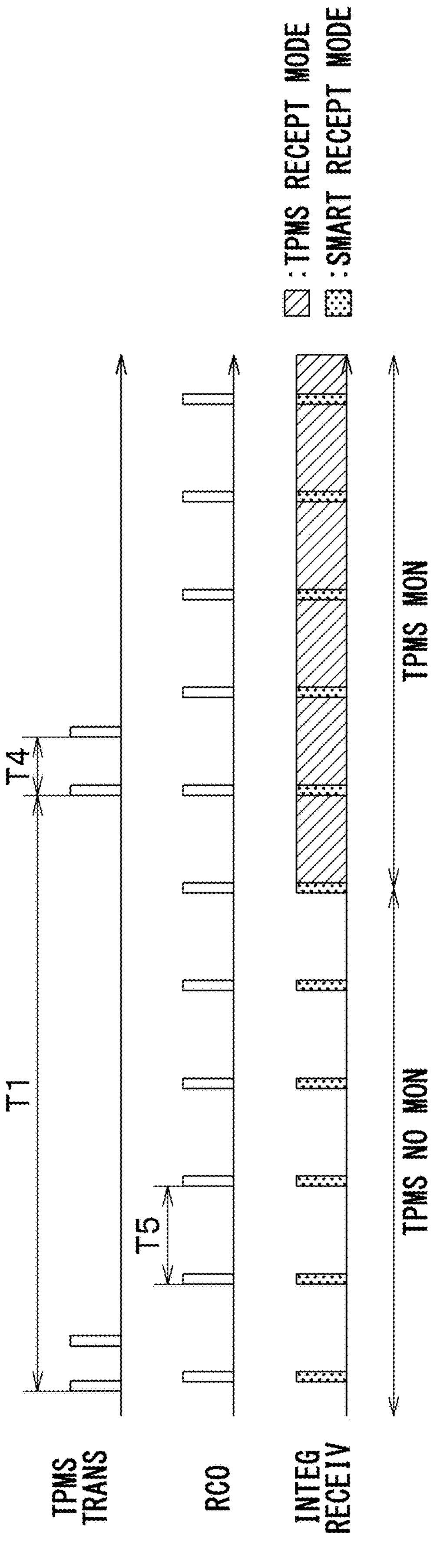
FIG. 4 is a timing chart for explaining the operation mode of the integrated receiver and the like while the start switch is in the off state.
Figure 5:
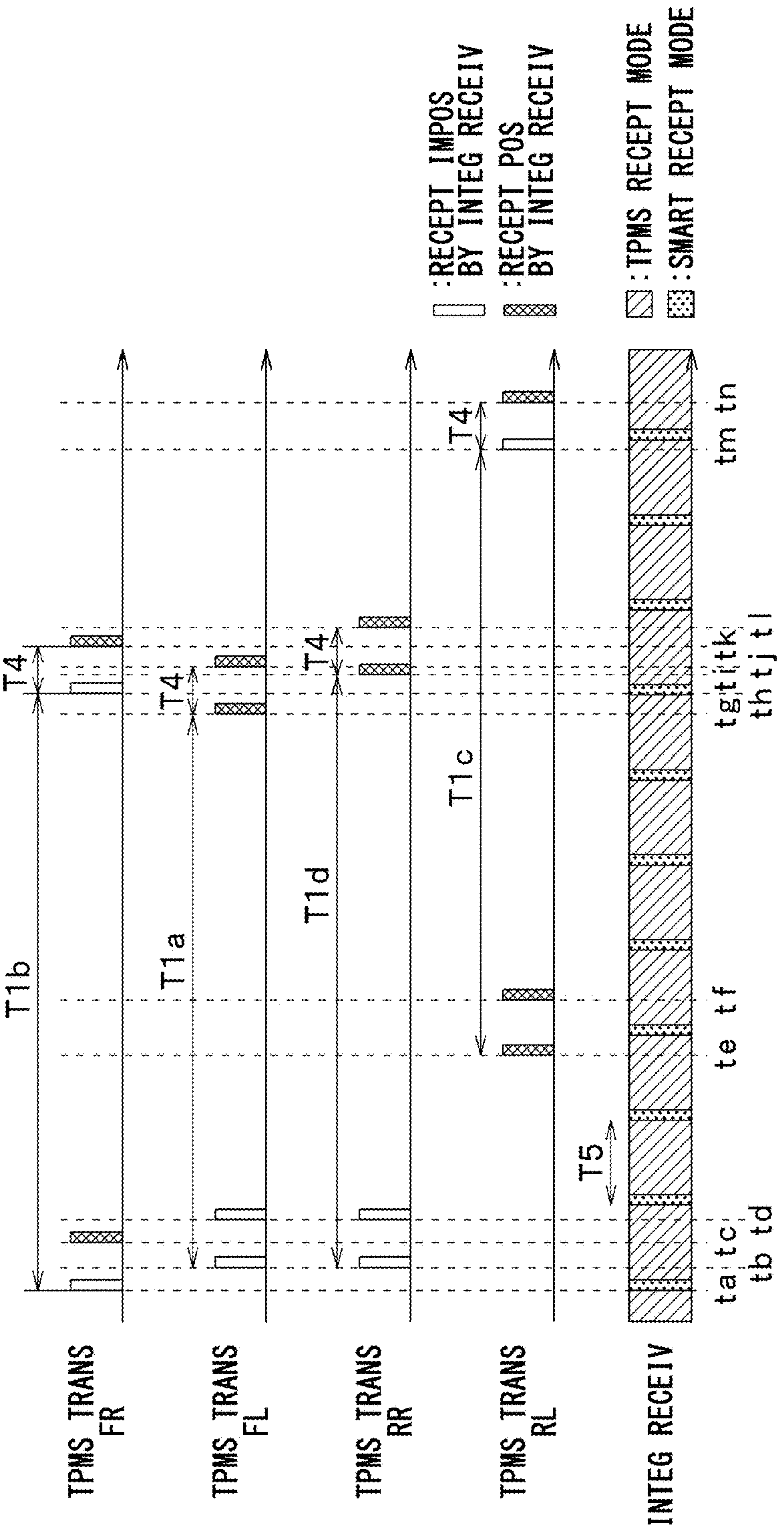
FIG. 5 is a timing chart for explaining the transmission timing of the frame from the TPMS transmitter of each tire.

Each of the TPMS transmitters 2*a* to 2*d* of this embodiment transmits a frame multiple times at a transmission interval T4 that is smaller than the regular transmission period T1. For example, as shown in FIGS. 4 and 5, each of the TPMS transmitters 2*a* to 2*d* transmits a frame at a regular transmission period T1, and transmits another frame at a predetermined transmission interval T4 after transmitting the frame. The transmission interval T4 in this embodiment is the same time interval for each of the TPMS transmitters 2*a* to 2*d*. Here, in the examples shown in FIGS. 4 and 5, the frame is transmitted twice every regular transmission period T1, alternatively, the frame may be transmitted three or more times. Here, when transmitting a frame three or more times, for example, the transmission interval T4 between the first transmission and the second transmission may be equal to or different from the transmission interval T4 between the second transmission and the third transmission. Alternatively, for example, the transmission interval T4 between the first transmission and the second transmission may be a constant interval, and the transmission interval T4 between the second transmission and the third transmission may be random.

Here, in each of the TPMS transmitters 2*a* to 2*d*, the frame transmission timing is set so that it is difficult to overlap the timing of the frame transmission and the timing at which the output of a SMART request signal RCO, which will be described later. Each of the TPMS transmitters 2*a* to 2*d* is set so that the frame transmission interval T4 does not match an integral multiple of a first intermittent period T5, which will be described later. Specifically, the frame transmission interval T4 is set to a time interval smaller than a first intermittent period T5, which will be described later.

Further, each of the TPMS transmitters 2*a* to 2*d* is configured such that the regular transmission period T1 can be changed within a predetermined reference range in order to avoid overlapping the frame transmission timing. For example, each of the TPMS transmitters 2*a* to 2*d* obtains a regular transmission period T1 by adding or subtracting a random value generated by a random number function or the like to a reference time, and transmits a frame at each regular transmission period T1. In this way, the regular transmission period T1 is randomly changed every time. In the example shown in FIG. 5, the regular transmission period T1*a* of the TPMS transmitter 2*a* of the left front tire FL is the smallest, and the regular transmission period T1*c* of the TPMS transmitter 2*c* of the left rear tire RL is the largest. Further, the regular transmission period T1*b* of the TPMS transmitter 2*b* of the right front tire FR is smaller than the regular transmission period T1*d* of the TPMS transmitter 2*d* of the right rear tire RR.

The TPMS transmitters 2*a* to 2*d* configured as described above are attached to the air valves of the tires of the respective wheels 10*a* to 10*d*, for example, so that the sensor unit 21 is located in the inner space of the tire.

The integrated receiver 3 is an in-vehicle receiver attached to the vehicle body 11 side. The integrated receiver 3 constitutes a part of the TPMS and also constitutes a part of the Smart Entry (registered trademark) system. The integrated receiver 3 has a function as a receiver that receives a frame transmitted by the TPMS transmitters 2*a* to 2*d*, and also a receiver that receives a specific electric wave emitted by a mobile terminal 4 such as an electronic key. In order to avoid interference of the electric waves, the electric waves emitted by the TPMS transmitters 2*a* to 2*d* and the specific electric wave emitted by the mobile terminal 4 are set to have different frequencies.

Here, the smart entry system is a system that performs authentication via wireless communication between the mobile terminal 4 and the authentication ECU 5 through the integrated receiver 3 when the mobile terminal 4 owned by the authorized user of the vehicle 1 enters the wireless communication area around the vehicle 1. Here, for convenience, the smart entry system may be referred to as "SMART" below.

The authentication ECU 5 performs control to confirm whether the mobile terminal 4 is disposed in the wireless communication area around the vehicle 1 or not. For example, as shown in FIG. 4, the authentication ECU 5 has a voltage signal terminal that is connected to the integrated receiver 3 while the start switch SSW is in the off state. The authentication ECU 5 switches the operation mode of the integrated receiver 3 by turning on the SMART request signal RCO, which is the output of the voltage signal terminal, every predetermined first intermittent period T5.

Specifically, when the SMART request signal RCO is turned on, the operation mode of the integrated receiver 3 switches to the SMART reception mode in which the specific electric wave from the mobile terminal 4 can be received. Further, when the SMART request signal RCO is turned off, the operation mode of the integrated receiver 3 switches to a power saving mode or a TPMS reception mode, which will be described later.

When the existence of the mobile terminal 4 is confirmed, the authentication ECU 5 authenticates whether the mobile terminal 4 is owned by an authorized user. When the authentication is successful, the authentication ECU 5 performs various controls such as unlocking the doors of the vehicle 1 and permitting the start of the drive source (for example, the engine) of the vehicle 1.

Figure 6:
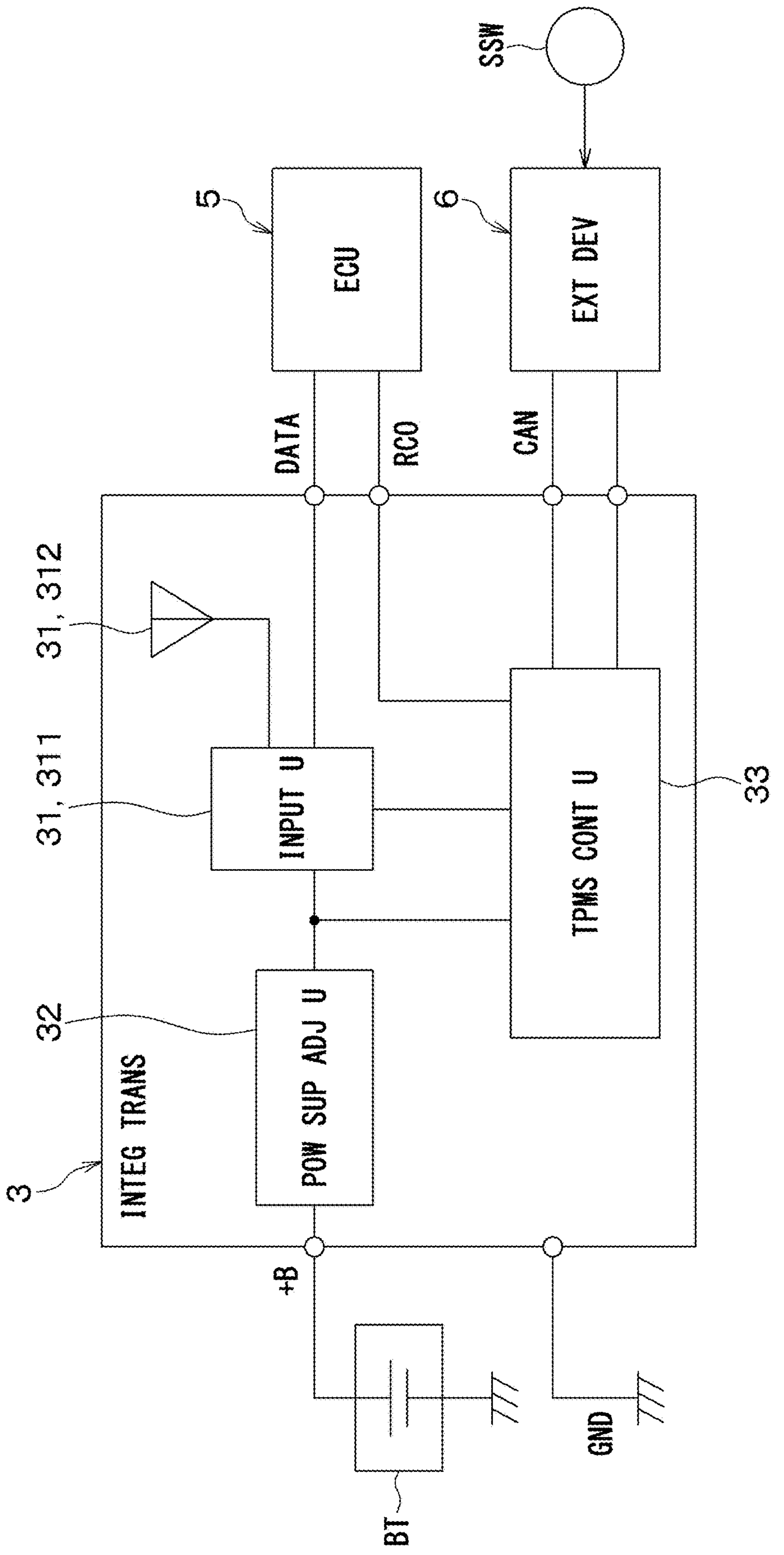
FIG. 6 is a block diagram showing an integrated receiver.

Next, the main configuration of the integrated receiver 3 will be explained with reference to FIG. 6. As shown in FIG. 6, the integrated receiver 3 includes a electric wave reception unit 31, a power supply adjustment unit 32, and a TPMS control unit 33.

The electric wave reception unit 31 includes an input unit 311 and a reception antenna unit 312. The input unit 311 receives a frame transmitted from each of the TPMS transmitters 2*a* to 2*d* and a specific electric wave emitted by the mobile terminal 4 through the reception antenna unit 312.

The electric wave reception unit 31 can change the reception frequency so that the electric wave reception unit 31 can receive the specific electric wave emitted by the mobile terminal 4 with priority over an electric wave emitted by each of the TPMS transmitters 2*a* to 2*d*. For example, while the SMART request signal RCO is in the on state, the electric wave reception unit 31 sets the reception frequency to a frequency of which the specific electric wave emitted by the mobile terminal 4 can be received so that the reception of the specific electric wave is prioritized over the reception of the frame. Here, while the SMART request signal RCO is in the off state, the electric wave reception unit 31 changes the reception frequency to a frequency of which the electric wave emitted by each of the TPMS transmitters 2*a* to 2*d* can be received, based on the control signal output by the TPMS control unit 33.

When receiving the specific electric wave emitted by the mobile terminal 4, the electric wave reception unit 31 outputs data related to door locking, unlocking, and the like included in the specific electric wave to the authentication ECU 5. Furthermore, the electric wave reception unit 31 outputs the frame emitted by each of the TPMS transmitters 2*a* to 2*d* to the TPMS control unit 33. Here, the method of changing the reception frequency of the input unit 311 described above is an example. The reception frequency of the integrated receiver 3 may be changed by a method different from that described above.

The power supply adjustment unit 32 generates power for driving the electric wave reception unit 31 and the TPMS control unit 33 of the integrated receiver 3 from a predetermined voltage (e.g., +B) applied from the battery BT. The integrated receiver 3 operates based on the power generated by the power supply adjustment unit 32.

The TPMS control unit 33 includes a microcomputer having a processor and a memory, and its periphery devices. The TPMS control unit 33 executes a predetermined process according to a program stored in memory. Here, the memory includes a non-transitional tangible storage medium.

The TPMS control unit 33 is in an active operation mode while the start switch SSW is in the on state, and executes various processes related to reception of the electric wave by the electric wave reception unit 31 and monitoring of the tire air pressure by the TPMS control unit 33 at any time. In this embodiment, the TPMS control unit 33 constitutes a "control unit" that detects the occurrence of a decrease in the tire air pressure based on data related to the tire air pressure included in the frame transmitted from the TPMS transmitters 2*a* to 2*d*.

On the other hand, while the start switch SSW is in the off state, the TPMS control unit 33 basically switches to a power saving mode with low power consumption, such as a sleep mode, but if a predetermined condition is met while the start switch SSW is in the off state, the TPMS control unit 33 temporarily switches to the active operation mode. Here, in the power saving mode, dark current in the integrated receiver 3 is suppressed by limiting the functions of the electric wave reception unit 31 and the TPMS control unit 33.

Here, the tire air pressure may decrease below a predetermined alarm threshold while the start switch SSW is in the off state. For this reason, it may be preferable to continue monitoring the tire air pressure using the TPMS even while the start switch SSW is in the off state.

However, if simply attempting to receive the frame and the specific electric wave separately while the starting switch SSW is in the off state, the operation time of the integrated receiver 3 may be increased while the starting switch SSW is in the off state, and the dark current in the integrated receiver 3 may be significantly increased. Here, the dark current is a standby current that constantly flows even when the start switch SSW is in the off state.

In view of the above point, the TPMS control unit 33 switches to the SMART reception mode every predetermined first intermittent period T5 while the start switch SSW is in the off state, and switches to the TPMS reception mode from the power saving mode or the SMART reception mode every predetermined second intermittent period T2.

The SMART reception mode is an operation mode in which the electric wave reception unit 31 receives the specific electric wave emitted by the mobile terminal 4. For example, every time the SMART request signal RCO is turned on, the TPMS control unit 33 outputs a control signal indicating the on state of the SMART request signal RCO to the electric wave reception unit 31, and changes the reception frequency of the electric wave reception unit 31 to a frequency that is capable of receiving the specific electric wave emitted by the mobile terminal 4.

The TPMS reception mode is an operation mode in which the electric wave reception unit 31 receives the frame to intermittently monitor the tire air pressure. For example, the TPMS control unit 33 outputs a control signal instructing to receive the frame to the electric wave reception unit 31 every predetermined second intermittent period T2, and changes the reception frequency of the electric wave reception unit 31 that is capable of receiving the electric wave emitted from each of the TPMS transmitters 2*a* to 2.

In this way, the operation mode of the integrated receiver 3 while the start switch SSW is in the off state is switched to the power saving mode, the SMART reception mode, and the TPMS reception mode. Here, the SMART reception mode is a "specific mode" in which the electric wave reception unit 31 of the integrated receiver 3 receives the specific electric wave every predetermined first intermittent period T5. The TPMS reception mode is a "monitoring mode" in which the electric wave reception unit 31 of the integrated receiver 3 receives the frame at every predetermined second intermittent period T2 to intermittently monitor the tire air pressure. The power saving mode is an operation mode that consumes less electric power than the SMART reception mode and the TPMS reception mode.

Upon receiving the frame from the electric wave reception unit 31, the TPMS control unit 33 monitors the occurrence of a decrease in the tire air pressure based on the data related to the tire air pressure included in the received frame. Specifically, the TPMS control unit 33 calculates the tire air pressure by performing various signal processing and calculations and the like based on the data related to the tire air pressure indicated in the frame. Then, the monitoring control unit 331 outputs an electrical signal corresponding to the determined tire air pressure to the external device 6 including the in-vehicle display via CAN or the like. For example, the monitoring control unit 331 compares the tire air pressure with a predetermined alarm threshold, and when detecting that the tire air pressure has decreased below the predetermined alarm threshold, the monitoring control unit 331 outputs a signal indicating the decrease to the external device 6. Here, the monitoring control unit 331 can also obtain the tire air pressure of each of the four wheels 10*a* to 10*d*, and display the tire air pressure in association with each wheel 10*a* to 10*d* on the in-vehicle display.

In the memory of the TPMS control unit 33, ID information of the TPMS transmitters 2*a* to 2*d* arranged at each of the wheels 10*a* to 10*d* is stored in association with the position of each of the wheels 10*a* to 10*d*. Therefore, the TPMS control unit 33 recognizes which of the TPMS transmitter 2*a* to 2*d* attached to the wheels 10*a* to 10*d* corresponds to the received frame by verifying with the ID information indicated in the frame, and specifies the wheel of which the tire air pressure is decreased. Based on the above processes, when the decrease in the tire air pressure occurs, the wheel of which the tire air pressure is decreased is specified and indicated on the in-vehicle display.

Here, the shorter the period of monitoring the tire air pressure while the starting switch SSW is in the off state, the real-time performance is improved, but the dark current of the integrated receiver 3 also increases. Therefore, the period of monitoring the tire air pressure while the start switch SSW is in the off state is longer than the period of receiving the specific electric wave emitted by the mobile terminal 4. That is, the second intermittent period T2 is larger than the first intermittent period T5. It may be preferable that this second intermittent period T2 is set to, for example, several hours. Here, the first intermittent period T5 is set to, for example, one second or less. As a result, while the start switch SSW is in the off state, a non-monitoring period, in which the SMART reception mode and the power saving mode are alternately switched, and a monitoring period, in which the SMART reception mode and the TPMS reception mode are alternately switched, are alternately repeated.

Further, the monitoring time T3 for monitoring the tire air pressure may be preferably set to a small value because the dark current increases as the monitoring time T3 becomes longer. If the monitoring time T3 is too small, it becomes difficult to receive the frame. Therefore, as shown in FIG. 3, the monitoring time T3 is set to be longer than the regular frame transmission period T1 by the TPMS transmitters 2*a* to 2*d*. In view of interference of frames from the TPMS transmitters 2*a* to 2*d*, and the like, it may be preferable that the monitoring time T3 is set to be twice or more the regular transmission period T1. Furthermore, in view of an increase in the dark current, the monitoring time T3 is set to be shorter than the second intermittent period T2.

As described above, the TPMS according to the present embodiment is configured. Subsequently, the operation of the TPMS of the present embodiment will be described.

As shown in FIG. 3, while the start switch SSW is in the on state, the TPMS receives the frame transmitted from each of the TPMS transmitters 2*a* to 2*d*, and monitors the tire air pressure described above based on the received frame.

On the other hand, while the start switch SSW is in the off state, the TPMS intermittently receives the frame transmitted from each of the TPMS transmitters 2*a* to 2*d* while receiving specific electric wave emitted by the mobile terminal 4, as shown in FIG. 4, and monitors the tire air pressure. Hereinafter, an example of the control process executed by the integrated receiver 3 while the starting switch SSW is in the off state will be described with reference to FIG. 7. The control process shown in FIG. 7 is periodically executed by the TPMS control unit 33 when the start switch SSW is turned off.

Figure 7:
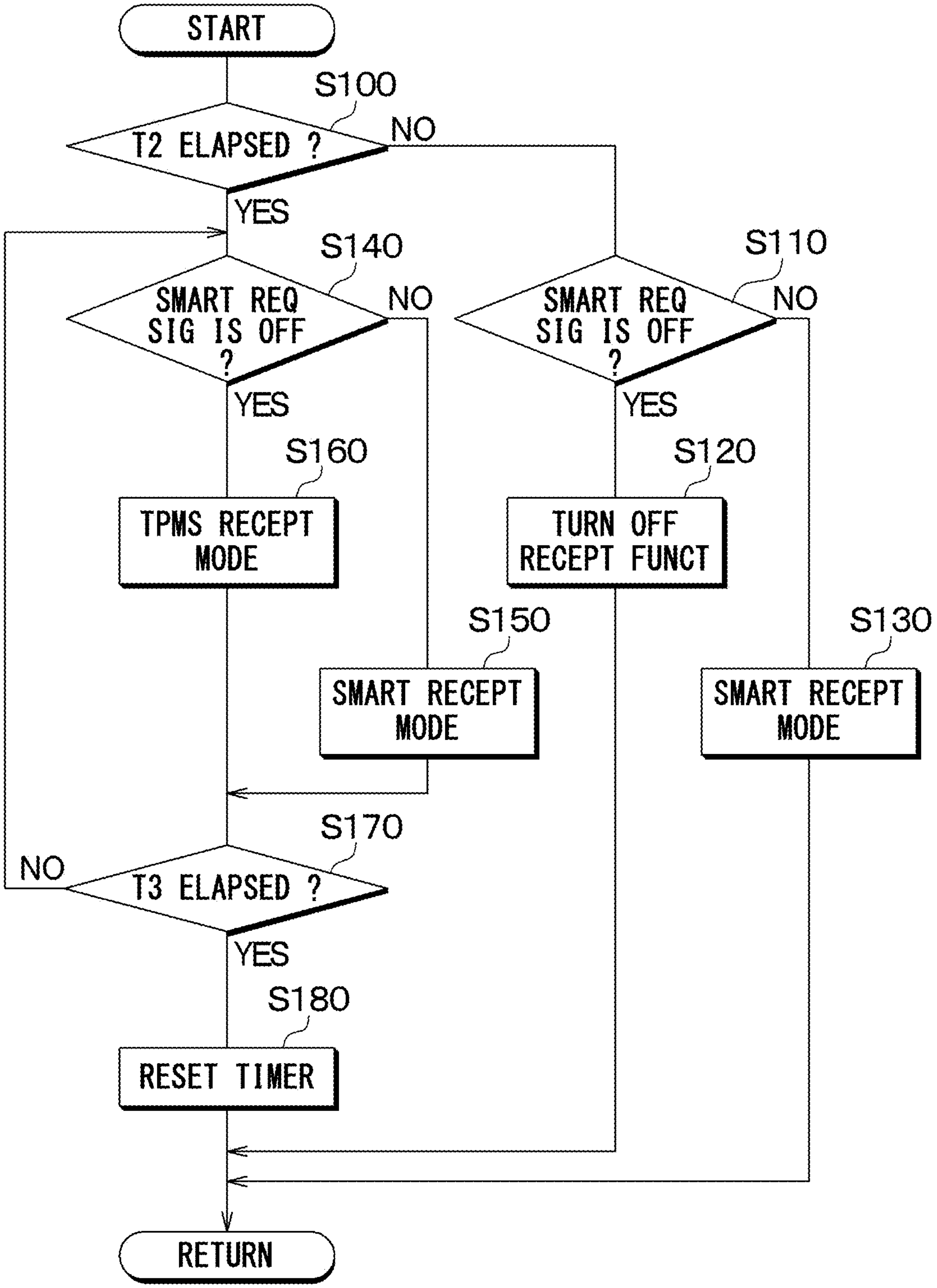
FIG. 7 is a flowchart showing an example of a reception process that the integrated receiver executes while the starting switch is in the off state.

As shown in FIG. 7, in step S100, the integrated receiver 3 determines whether or not the second intermittent period T2 has elapsed. This determination process is performed based on the time measured by a timer built into the TPMS control unit 33.

When the time measured by the timer has not elapsed the second intermittent period T2, the integrated receiver 3 determines in step S110 whether the SMART request signal RCO is in the off state. Specifically, the integrated receiver 3 determines that the SMART request signal RCO is in the off state when the output of the voltage signal terminal is in the off state. Further, the integrated receiver 3 determines that the SMART request signal RCO is in the on state when the output of the voltage signal terminal is in the on state.

When the SMART request signal RCO is in the off state, the integrated receiver 3 switches to the power saving mode in step S120, and turns off the reception function of the electric wave reception unit 31 for receiving the frame and the specific electric wave emitted by the mobile terminal 4. Thereafter, the integrated receiver 3 exits this process. Further, when the SMART request signal RCO is in the on state, the integrated receiver 3 switches to the SMART reception mode in step S130, and turns on the reception function of the electric wave reception unit 31 for receiving the specific electric wave. Thereafter, the integrated receiver 3 exits this process.

When the time measured by the timer has elapsed the second intermittent period T2, the integrated receiver 3 determines in step S140 whether the SMART request signal RCO is in the off state. Specifically, the integrated receiver 3 determines that the SMART request signal RCO is in the off state when the output of the voltage signal terminal is in the off state. Further, the integrated receiver 3 determines that the SMART request signal RCO is in the on state when the output of the voltage signal terminal is in the on state.

Further, when the SMART request signal RCO is in the on state, the integrated receiver 3 switches to the SMART reception mode in step S150, and turns on the reception function of the electric wave reception unit 31 for receiving the specific electric wave. Further, when the SMART request signal RCO is in the off state, the integrated receiver 3 switches to the TPMS reception mode and turns on the reception function of the electric wave reception unit 31 for receiving the frame in step S160.

After setting the operation mode in steps S150 and S160, the integrated receiver 3 determines in step S170 whether or not the monitoring time T3 has elapsed. This determination process is performed based on the time measured by a timer built into the TPMS control unit 33.

When the time measured by the timer has not elapsed the monitoring time T3, the integrated receiver 3 returns to step S140 and again determines whether the SMART request signal RCO is in the off state. On the other hand, when the time measured by the timer has elapsed the monitoring time T3, the integrated receiver 3 resets the timer in step S180 and exits from this process.

The integrated receiver 3 for the TPMS described above switches to the SMART reception mode every predetermined first intermittent period T5 and switches to the TPMS reception mode every predetermined second intermittent period T2 while the start switch SSW is in the off state. According to this, while the starting switch SSW is in the off state, reception of the specific electric wave and monitoring of the tire air pressure are performed intermittently, so the operation time of the integrated receiver 3 while the starting switch SSW is in the off state can be reduced. Therefore, it is possible to receive the specific electric wave and monitor the tire air pressure while suppressing an increase in the dark current in the integrated receiver 3. Since the TPMS of this embodiment monitors the tire air pressure even while the start switch SSW is in the off state, it is possible to notify the user of a decrease in the tire air pressure at an early stage.

(1) The second intermittent period T2 is larger than the first intermittent period T5. As a result, while the start switch SSW is in the off state, a non-monitoring period, in which the SMART reception mode and the power saving mode are alternately switched, and a monitoring period, in which the SMART reception mode and the TPMS reception mode are alternately switched, are alternately repeated. According to this, the time during which the tire air pressure is not monitored while the starting switch SSW is in the off state increases, so it is possible to suppress an increase in the dark current in the integrated receiver 3 while the starting switch SSW is in the off state.

(2) The tire pressure monitoring time T3 in the TPMS reception mode is longer than the regular transmission period T1. In this way, by making the monitoring time T3 longer than the regular frame transmission period T1, it becomes easier for the integrated receiver 3 to appropriately receive the frame.

(3) Each of the TPMS transmitters 2*a* to 2*d* of this embodiment transmits a frame multiple times at a transmission interval T4 that is smaller than the regular transmission period T1. According to this, the frame transmitted by each of the TPMS transmitters 2*a* to 2*d* can be appropriately received by the integrated receiver 3.

For example, regarding the right front tire FR shown in the top row of FIG. 5, at time ta, the frame transmission timing of the TPMS transmitter 2*b* overlaps with the timing when the SMART request signal RCO is turned on, so the integrated receiver 3 cannot receive the frame.

However, at time tc, which is a transmission interval T4 from time ta, the frame transmission timing of the TPMS transmitter 2*b* does not overlap with the timing at which the SMART request signal RCO is turned on, so the integrated receiver 3 can receive the frame.

(4) The transmission interval T4 is a time interval different from an integral multiple of the first intermittent period T5. According to this, it is possible to avoid the frame transmission timing from continuously overlapping with the timing at which the SMART request signal RCO is turned on, so that it becomes easier for the integrated receiver 3 to receive the frame transmitted by each of the TPMS transmitters 2*a* to 2*d* properly.

(5) Specifically, the transmission interval T4 is a time interval smaller than the first intermittent period T5.

According to this, it becomes easier for the integrated receiver 3 to receive the frame transmitted by each of the TPMS transmitters 2*a* to 2*d* in a short period of time.

(6) The regular transmission period T1 of each of the TPMS transmitters 2*a* to 2*d* can be changed within a predetermined reference range. According to this, it is possible to avoid the timings at which the frames transmitted by the TPMS transmitters 2*a* to 2*d* reach the integrated receiver 3 from continuously being overlapped with each other, so that the frame transmitted by each of the TPMS transmitters 2*a* to 2*d* can be properly received by the integrated receiver 3.

For example, as shown in the second and third rows from the top of FIG. 5, at time tb and time td, the frame transmission timing of the TPMS transmitter 2*a* of the left front tire FL and the frame transmission timing of the TPMS transmitter 2*d* of the right rear tire RR are overlapped with each other. Therefore, the integrated receiver 3 cannot properly receive the frame.

However, the regular transmission period T1*a* of the TPMS transmitter 2*a* of the left front tire FL is smaller than the regular transmission period T1*d* of the TPMS transmitter 2*d* of the right rear tire RR.

As a result, at time tg and time tj, which are separated by the regular transmission period T1*a* from times tb and td, the frame transmission timing of the TPMS transmitter 2*a* of the left front tire FL does not overlap with the frame transmission timing of the TPMS transmitter 2*d* of the right rear tire RR. Therefore, the integrated receiver 3 can receive the frame transmitted from the TPMS transmitter 2*a* of the left front tire FL.

Further, at time ti and time tl, which are separated by the regular transmission period T1*d* from times tb and td, the frame transmission timing of the TPMS transmitter 2*a* of the left front tire FL does not overlap with the frame transmission timing of the TPMS transmitter 2*d* of the right rear tire RR. Therefore, the integrated receiver 3 can receive the frame transmitted from the TPMS transmitter 2*d* of the right rear tire RR.

In the example shown in FIG. 5, the frame transmission timing of the TPMS transmitter 2*c* of the left rear tire RL shown in the bottom row of FIG. 5 does not overlap with the frame transmission timings of other TPMS transmitters 2*a*, 2*b*, 2*d* and the timing at which the SMART request signal RCO is turned on. Therefore, at times te, tf, tm, and tn, the integrated receiver 3 can receive the frame transmitted from the TPMS transmitter 2*c* of the left rear tire RL.

Second Embodiment

Next, a second embodiment will be described with reference to FIG. 8. In the present embodiment, differences from the first embodiment will be mainly described.

Figure 8:
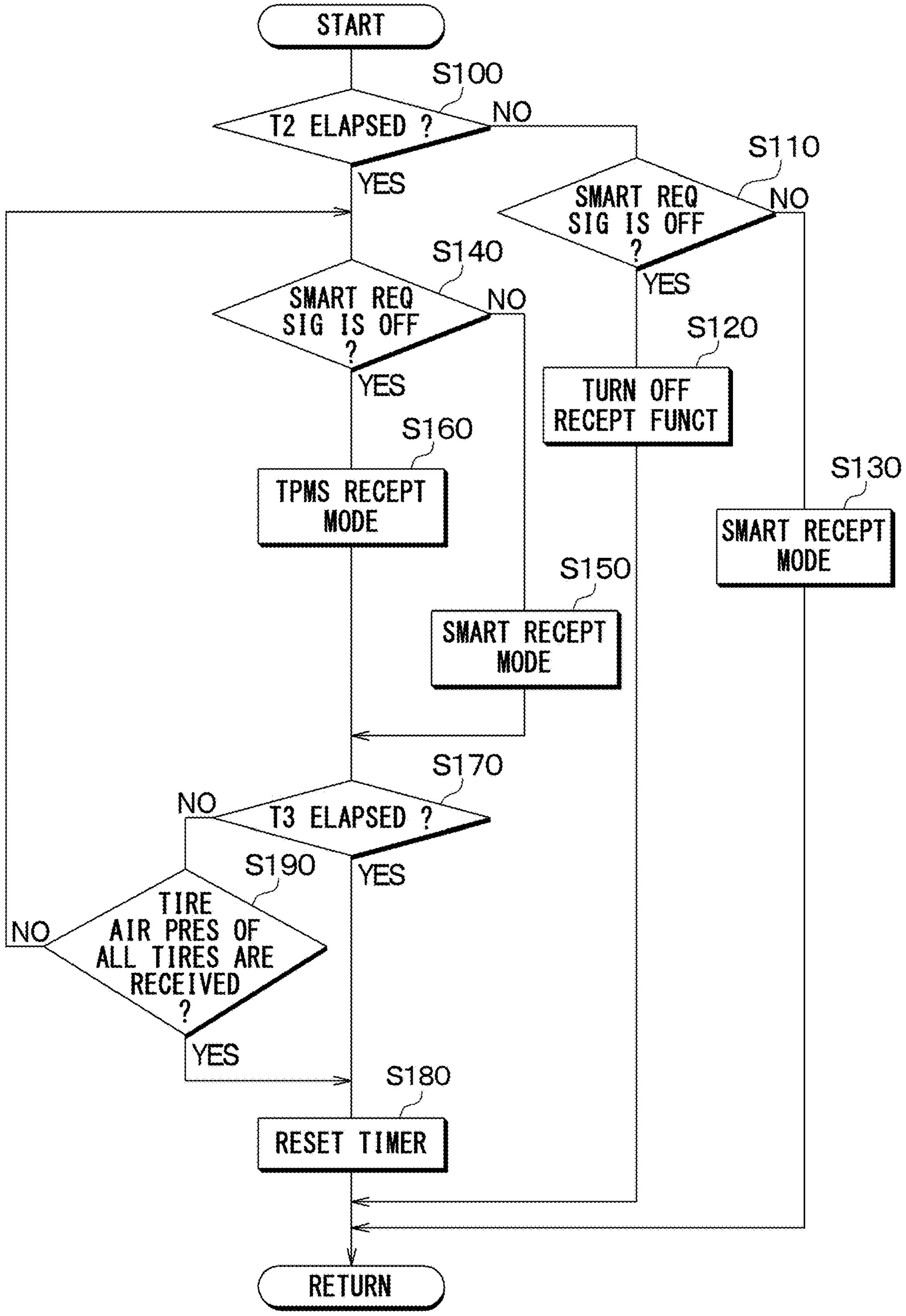
FIG. 8 is a flowchart showing an example of a reception process that the integrated receiver executes while the start switch is in the off state according to a second embodiment.

FIG. 8 corresponds to the flowchart of FIG. 7 described in the first embodiment. Each process in steps S100 to S180 in FIG. 8 is the same as each process in steps S100 to S180 in FIG. 7, and therefore a description thereof will be omitted.

As shown in FIG. 8, when it is determined in step S170 that the monitoring time T3 has not elapsed, the integrated receiver 3 shifts to step S190. In step S190, the integrated receiver 3 determines whether or not the reception of frames from all the TPMS transmitters 2*a* to 2*d* has been completed and the tire air pressures of all tires have been received.

When the integrated receiver 3 has not been able to receive the tire air pressures of all tires, it returns to step S140 and again determines whether the SMART request signal RCO is in the off state. On the other hand, when the tire air pressures of all tires have been received, the integrated receiver 3 resets the timer in step S180 and exits from this process.

Others are the same as those in the first embodiment. The integrated receiver 3 in the present embodiment can achieve the effects obtained from the common configuration or the equivalent configuration to the first embodiment.

According to the present embodiment, the following effects can be obtained.

(1) When the TPMS control unit 33 completes receiving the frame from each of the TPMS transmitters 2*a* to 2*d* in the TPMS reception mode, the TPMS control unit 33 switches to the power saving mode. According to this, it is possible to suppress a wasteful operation of the integrated receiver 3 while the starting switch SSW is in the off state, and an increase in the dark current in the integrated receiver 3 can be sufficiently suppressed.

Third Embodiment

Next, a third embodiment will be described with reference to FIG. 9. In the present embodiment, differences from the first embodiment will be mainly described.

In the TPMS of the first embodiment, the frame transmission interval T4 is the same time interval for each of the TPMS transmitters 2*a* to 2*d*. In contrast, in the TPMS of this embodiment, the frame transmission interval T4 can be changed within a predetermined range in order to avoid overlapping of the frame transmission timing in each of the TPMS transmitters 2*a* to 2*d*. For example, each of the TPMS transmitters 2*a* to 2*d* obtains the transmission interval T4 by adding or subtracting a random value generated by a random number function or the like to the reference interval, and transmits the frame at the transmission interval T4.

In this way, the frame transmission interval T4 is randomly changed each time. For example, in the example shown in FIG. 9, the transmission interval T4*b* of the TPMS transmitter 2*b* of the right front tire FR is the smallest, and the transmission interval T4*d* of the TPMS transmitter 2*d* of the right rear tire RR is the largest. Further, the transmission interval T4*a* of the TPMS transmitter 2*a* of the left front tire FL is larger than the transmission interval T4*c* of the TPMS transmitter 2*c* of the left rear tire RL.

Others are the same as those in the first embodiment. The integrated receiver 3 in the present embodiment can achieve the effects obtained from the common configuration or the equivalent configuration to the first embodiment.

According to the present embodiment, the following effects can be obtained.

(1) The frame transmission interval T4 of each of the TPMS transmitters 2*a* to 2*d* can be changed within a predetermined range. According to this, it is possible to avoid the timings at which the frames transmitted by the TPMS transmitters 2*a* to 2*d* reach the integrated receiver 3 from continuously being overlapped with each other, so that the frame transmitted by each of the TPMS transmitters 2*a* to 2*d* can be properly received by the integrated receiver 3.

Figure 9:
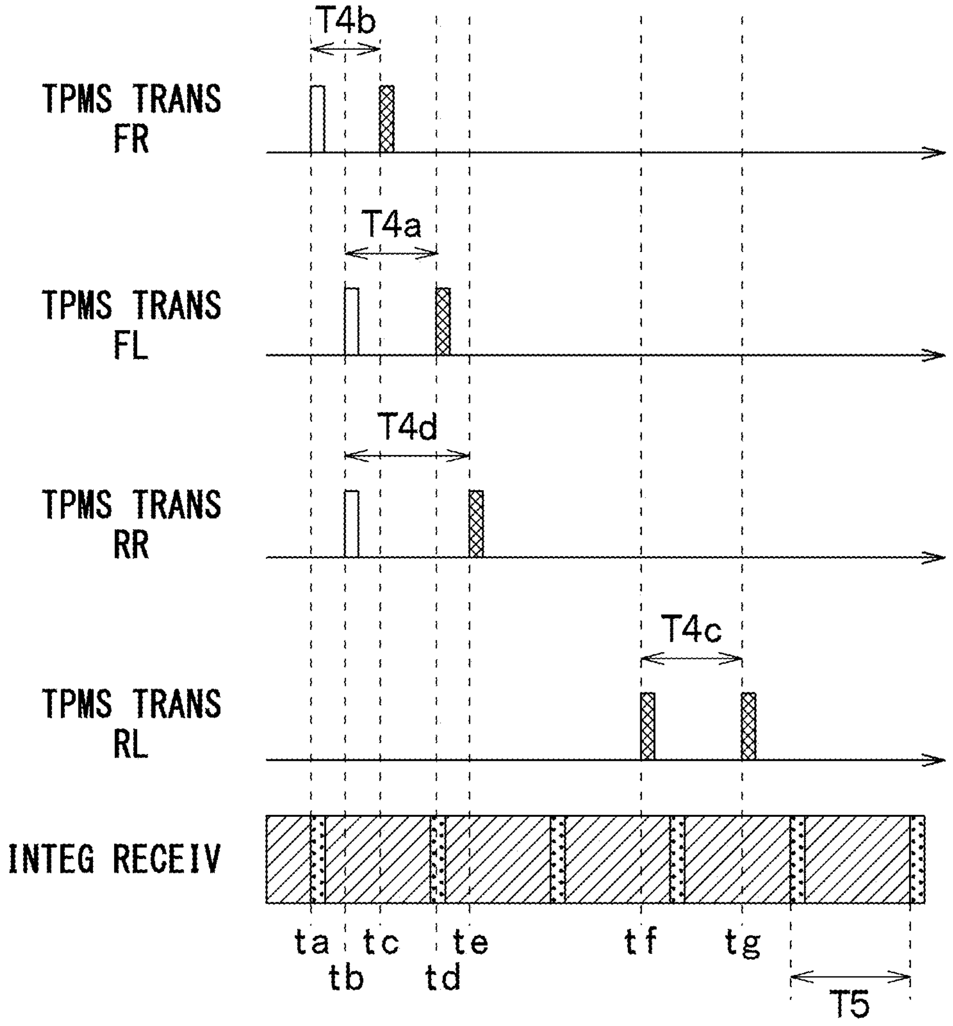
FIG. 9 is a timing chart for explaining the transmission timing of the frame for the TPMS transmitter of each tire according to a third embodiment.

For example, as shown in the second and third rows from the top of FIG. 9, at time tb, the frame transmission timing of the TPMS transmitter 2*a* of the left front tire FL and the frame transmission timing of the TPMS transmitter 2*d* of the right rear tire RR are overlapped with each other. Therefore, the integrated receiver 3 cannot receive the frame.

However, the transmission interval T4*a* of the TPMS transmitter 2*a* of the left front tire FL is smaller than the transmission interval T4*d* of the TPMS transmitter 2*d* of the right rear tire RR.

As a result, at time td, which is separated by the regular transmission period T4*a* from time tb, the frame transmission timing of the TPMS transmitter 2*a* of the left front tire FL does not overlap with the frame transmission timing of the TPMS transmitter 2*d* of the right rear tire RR. Therefore, the integrated receiver 3 can receive the frame transmitted from the TPMS transmitter 2*a* of the left front tire FL.

Further, at time te, which is separated by the regular transmission period T4*d* from time tb, the frame transmission timing of the TPMS transmitter 2*a* of the left front tire FL does not overlap with the frame transmission timing of the TPMS transmitter 2*d* of the right rear tire RR. Therefore, the integrated receiver 3 can receive the frame transmitted from the TPMS transmitter 2*d* of the right rear tire RR.

Modification of Third Embodiment

For example, the TPMS may be configured such that one of the frame transmission interval T4 and the regular transmission period T1 in each of the TPMS transmitters 2*a* to 2*d* can be changed, and the other cannot be changed.

Fourth Embodiment

Figure 10:
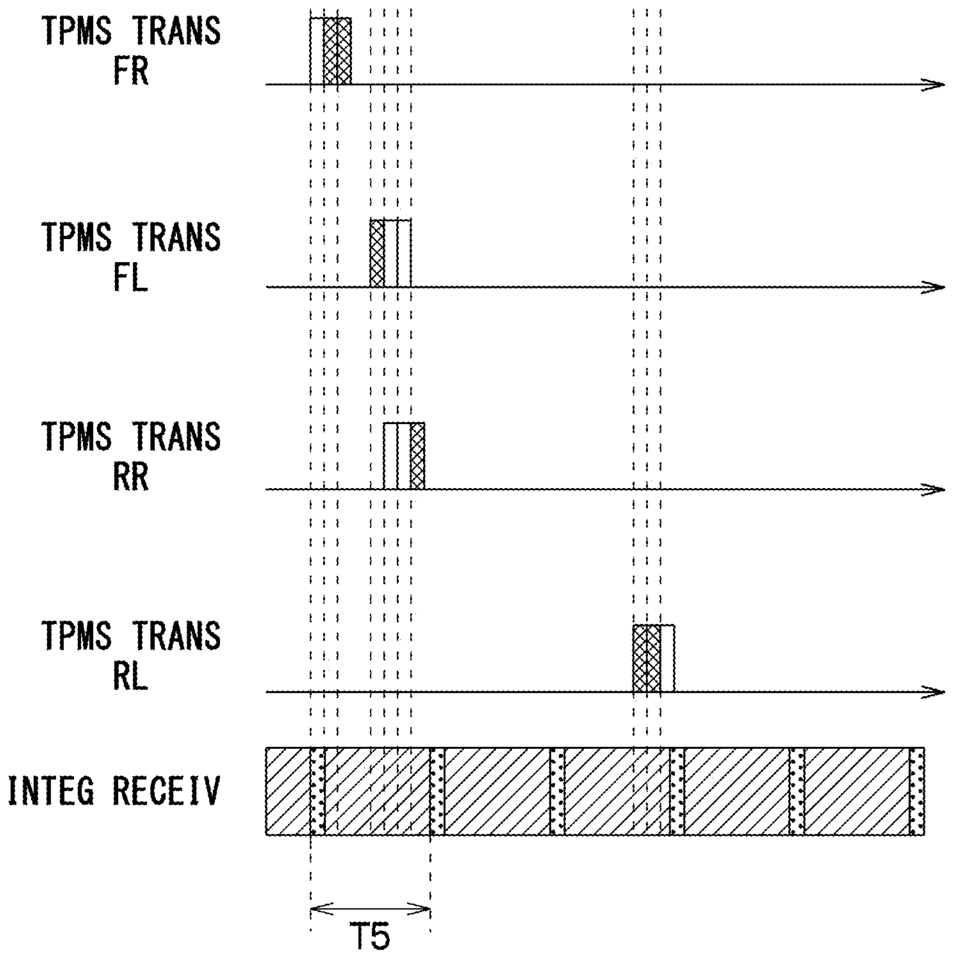
FIG. 10 is a timing chart for explaining the transmission timing of the frame from the TPMS transmitter of each tire according to a fourth embodiment.

Next, a fourth embodiment will be described with reference to FIG. 10. In the present embodiment, differences from the first embodiment will be mainly described.

Each of the TPMS transmitters 2*a* to 2*d* of the first embodiment is configured to transmit frames multiple times at a transmission interval T4 that is smaller than the regular transmission period T1. In contrast, each of the TPMS transmitters 2*a* to 2*d* of this embodiment is configured to continuously transmit frames multiple times. For example, as shown in FIG. 10, each TPMS transmitter 2*a* to 2*d* is configured to transmit a frame three times continuously. Here, the number of consecutive frame transmissions is not limited to three times, but may be two or four or more times.

Others are the same as those in the first embodiment. The integrated receiver 3 in the present embodiment can achieve the effects obtained from the common configuration or the equivalent configuration to the first embodiment.

According to the present embodiment, the following effects can be obtained.

(1) The multiple TPMS transmitters 2*a* to 2*d* continuously transmit frames multiple times. This also makes it difficult for the timings at which the frames transmitted from the multiple TPMS transmitters 2*a* to 2*d* reaches the integrated receiver 3 from being overlapped with each other, so that it becomes easier for the integrated receiver 3 to properly receive the frame transmitted by each of TPMS transmitters 2*a* to 2*d*.

Fifth Embodiment

A fifth embodiment is described next. In the present embodiment, differences from the first embodiment will be mainly described.

In general, anomaly such as a flat tire may tend to occur while the vehicle is running rather than when the vehicle is stopped, so it is thought that the tire air tends to change immediately after the start switch SSW is turned off.

Taking this into consideration, the TPMS control unit 33 changes the time interval of the second intermittent period T2 within a predetermined range.

Others are the same as those in the first embodiment. The integrated receiver 3 in the present embodiment can achieve the effects obtained from the common configuration or the equivalent configuration to the first embodiment.

(1) In the TPMS of this embodiment, the time interval of the second intermittent period T2 changes within a predetermined range. According to this, it can be expected that unnecessary operation in the integrated receiver 3 is suppressed and an increase in the dark current in the integrated receiver 3 is sufficiently suppressed.

Modification of Fifth Embodiment

The TPMS control unit 33 may, for example, change the time interval of the second intermittent cycle T2 periodically or irregularly within a predetermined range.

OTHER EMBODIMENTS

Although the representative embodiments of the present disclosure have been described above, the present disclosure is not limited to the embodiments and can be variously modified as follows, for example.

As in the embodiments described above, it may be preferable that the second intermittent period T2 is larger than the first intermittent period T5, but the second intermittent period T2 may not be larger than the first intermittent period T5.

In the above embodiment, the monitoring time T3 is longer than the regular transmission period T1, but the monitoring time T3 is not limited to this feature, and may be shorter than the regular transmission period T1, for example.

As in the embodiments described above, it may be preferable that the TPMS transmitters 2*a* to 2*d* transmit frames multiple times at a transmission interval T4 smaller than the regular transmission period T1, but the transmission interval T4 may not be smaller than the regular transmission period T1.

As in the above-described embodiment, it may be preferable that the transmission interval T4 is a time interval different from an integral multiple of the first intermittent period T5, but the transmission interval T4 may not be different from an integral multiple of the first intermittent period T5. Furthermore, although it may be preferable that the transmission interval T4 is a time interval smaller than the first intermittent period T5, but the transmission interval T4 may not be smaller than the first intermittent period T5.

As in the embodiments described above, it may be preferable that the transmission interval T4 of the TPMS transmitters 2*a* to 2*d* can be changed within a predetermined range, but the transmission interval T4 may not be changed within a predetermined range.

As in the embodiments described above, it may be preferable that the periodic transmission period T1 of the TPMS transmitters 2*a* to 2*d* is changeable within a predetermined reference range, but the periodic transmission period T1 may not be changeable within a predetermined reference range.

For example, it may be preferable that the integrated receiver 3 estimates the frame transmission timing of each of the TPMS transmitters 2*a* to 2*d* based on the times at which the signals are received from the TPMS transmitters 2*a* to 2*d*, and adjusts the tire pressure monitoring timing using the estimation results.

Here, when receiving a specific electric wave emitted by the mobile terminal 4, the operation time in the SMART reception mode is longer than when the specific electric wave is not being received. Therefore, it may be preferable that the transmission interval T4 is set to a time interval that is longer than the operation time in the SMART reception mode when receiving the specific electric wave emitted by the mobile terminal 4.

In the embodiment described above, the TPMS is applied to the vehicle 1 having four wheels 10*a* to 10*d*, but the present disclosure is applicable to a vehicle having three wheels and a vehicle having five or more wheels.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

The controller and the method described in the present disclosure may be implemented by a special purpose computer, which includes a memory and a processor programmed to execute one or more special functions implemented by computer programs of the memory. The controller and the method described in the present disclosure may be implemented by a special purpose computer including a processor with one or more dedicated hardware logic circuits. The controller and the method described in the present disclosure may be implemented by a combination of (i) a special purpose computer including a processor programmed to execute one or more functions by executing a computer program and a memory and (ii) a special purpose computer including a processor with one or more dedicated hardware logic circuits. The computer program may be stored in a non-transitory tangible computer-readable recording medium as an instruction to be executed by a computer.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle receiver for a tire air pressure monitoring system applied to a vehicle having a plurality of wheels equipped with tires, the in-vehicle receiver comprising:

an electric wave reception unit that receives a specific electric wave emitted by a mobile terminal and a frame having information related to a tire air pressure transmitted by a transmitter disposed in each of the tires of the plurality of wheels at a predetermined regular transmission period; and a control unit that detects an occurrence of a decrease in the tire air pressure based on data related to the tire air pressure in the frame, wherein:

the control unit switches to a specific mode in which the electric wave reception unit receives the specific electric wave at every predetermined first intermittent period while a starting switch of the vehicle is in an off state; and the control unit switches from the specific mode or a power saving mode to a monitoring mode in which the electric wave reception unit receives the frame at every predetermined second intermittent period to monitor the tire air pressure intermittently while the starting switch of the vehicle is in the off state.

2. The in-vehicle receiver according to claim 1, wherein:

the predetermined second intermittent period is larger than the predetermined first intermittent period to alternately switch between a non-monitoring period and a monitoring period while the starting switch of the vehicle is in the off state;

the specific mode and the power saving mode are alternately switched in the non-monitoring period; and the specific mode and the monitoring mode are alternately switched in the monitoring period.

3. The in-vehicle receiver according to claim 1, wherein:

a tire air pressure monitoring time in the monitoring mode is longer than the regular transmission period.

4. The in-vehicle receiver according to claim 1, wherein:

the control unit switches to the power saving mode when reception of the frame from the transmitter in all of the tires of the plurality of wheels is completed in the monitoring mode.

5. The in-vehicle receiver according to claim 1, wherein:

the control unit changes a time interval of the predetermined second intermittent period within a predetermined range.

6. A tire air pressure monitoring system for a vehicle having a plurality of wheels equipped with tires, the tire air pressure monitoring system comprising:

a plurality of transmitters respectively disposed in each of the tires of the plurality of wheels and transmitting a frame having information related to a tire air pressure at a predetermined regular transmission period; and an in-vehicle receiver disposed on a body side of the vehicle, wherein:

the in-vehicle receiver includes:

an electric wave reception unit that receives the frame and a specific electric wave emitted by a mobile terminal; and a control unit that detects an occurrence of a decrease in the tire air pressure based on data related to the tire air pressure in the frame, wherein:

the control unit switches to a specific mode in which the electric wave reception unit receives the specific electric wave at every predetermined first intermittent period while a starting switch of the vehicle is in an off state; and the control unit switches from the specific mode or a power saving mode to a monitoring mode in which the electric wave reception unit receives the frame at every predetermined second intermittent period to monitor the tire air pressure intermittently while the starting switch of the vehicle is in the off state.

7. The tire air pressure monitoring system according to claim 6, wherein:

each of the plurality of transmitters transmits the frame multiple times at a transmission interval smaller than the regular transmission period.

8. The tire air pressure monitoring system according to claim 7, wherein:

the transmission interval is a time interval different from an integral multiple of the first intermittent period.

9. The tire air pressure monitoring system according to claim 8, wherein:

each of the plurality of transmitters can change the transmission interval within a predetermined range.

10. The tire air pressure monitoring system according to claim 6, wherein:

each of the plurality of transmitters continuously transmits the frame a plurality of times.

11. The tire air pressure monitoring system according to claim 6, wherein:

each of the plurality of transmitters can change the regular transmission period within a predetermined reference range.

* * * * *